United States Patent
Fischer

(10) Patent No.: US 6,543,804 B2
(45) Date of Patent: Apr. 8, 2003

(54) VEHICLE OCCUPANT RESTRAINT SYSTEM

(75) Inventor: Anton Fischer, Leinweiler (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/732,228

(22) Filed: Dec. 7, 2000

(65) Prior Publication Data

US 2001/0038199 A1 Nov. 8, 2001

(30) Foreign Application Priority Data

Dec. 10, 1999 (DE) ..................... 299 21 743 U

(51) Int. Cl.⁷ ............................................. B60R 21/22
(52) U.S. Cl. ...................... 280/730.2; 28/736; 28/742
(58) Field of Search .................. 280/728.2, 730.2, 280/729, 736, 741, 742

(56) References Cited

U.S. PATENT DOCUMENTS

| | | | | |
|---|---|---|---|---|
| 5,273,309 A | * | 12/1993 | Lau et al. ................ | 280/730.2 |
| 5,794,973 A | * | 8/1998 | O'Loughlin et al. ........ | 102/531 |
| 5,957,487 A | * | 9/1999 | Stutz ....................... | 280/730.2 |
| 5,957,493 A | * | 9/1999 | Larsen et al. ............. | 280/730.2 |
| 6,123,355 A | * | 9/2000 | Sutherland ................ | 280/728.2 |
| 6,135,493 A | * | 10/2000 | Jost et al. ................ | 280/730.2 |
| 6,168,190 B1 | * | 1/2001 | Bowers et al. ............ | 280/730.2 |
| 6,176,513 B1 | * | 1/2001 | Neidert ..................... | 280/729 |
| 6,231,073 B1 | * | 5/2001 | White, Jr. .................. | 280/730.2 |
| 6,238,438 B1 | * | 5/2001 | Fischer et al. ............ | 280/728.2 |
| 6,273,457 B1 | * | 8/2001 | Fischer ..................... | 280/730.2 |
| 6,276,712 B1 | * | 8/2001 | Welch et al. .............. | 280/730.2 |
| 6,293,581 B1 | * | 9/2001 | Saita et al. ............... | 280/730.2 |

FOREIGN PATENT DOCUMENTS

| | | | |
|---|---|---|---|
| DE | 4231522 | 3/1994 | |
| DE | 29610920 U1 | 10/1996 | |
| DE | 19542436 | 5/1997 | |
| DE | 19637603 A1 | 3/1998 | |
| DE | 19707997 | 9/1998 | |
| DE | 29810222 | 11/1998 | |
| DE | 29822159 U1 | 6/1999 | |
| DE | 19911257 A1 | 9/2000 | |
| JP | 403273959 | * 12/1991 | ............ 280/730.2 |
| JP | 403276844 | * 12/1991 | ............ 280/730.2 |
| JP | 403281455 | * 12/1991 | ............ 280/730.2 |
| JP | 405038993 | * 2/1993 | ............ 280/730.2 |
| WO | WO9942333 | 8/1999 | |

* cited by examiner

*Primary Examiner*—Paul N. Dickson
*Assistant Examiner*—Toan To
(74) *Attorney, Agent, or Firm*—Tarolli, Sundheim, Covell & Tummino L.L.P.

(57) ABSTRACT

A vehicle occupant restraint system comprises a gas supply means which has an outer housing with at least two outlet openings. The restraint system further comprises at least two inflatable elements to which different outlet openings are associated and which are filled in parallel via the associated outlet openings. The outlet openings are designed such that during inflation of the elements gas flow rates through the individual outlet openings to the inflatable elements are different.

6 Claims, 2 Drawing Sheets

VEHICLE OCCUPANT RESTRAINT SYSTEM

TECHNICAL FIELD

This invention relates to a vehicle occupant restraint system.

BACKGROUND OF THE INVENTION

A known gas bag of a side impact protection system, which includes several chambers, is filled in that compressed gas discharged by a gas generator flows in parallel into several chambers of the gas bag. In a parallel filling method, one difficulty consists in adjusting the internal pressure of gas bags filled in parallel. For this purpose, various gas supply means with integrated gas generators having gas throughputs at different levels are associated to the individual chambers. Another possibility of supplying compressed gas into the individual chambers of the gas bag consists in providing a gas distribution tube which is introduced into the gas bag and which has an axial end to which the gas generator is connected. In this design, long flow paths are obtained, so that the gas generator must have a sufficient output in order to fill the chambers simultaneously.

BRIEF SUMMARY OF THE INVENTION

It is the object underlying the invention to provide a restraint system with a parallel filling of the inflatable elements, where the inflatable elements can better be adapted to their intended use. This is achieved in a vehicle occupant restraint system which comprises a gas supply means which has an outer housing with at least two outlet openings. The restraint system further comprises at least two inflatable elements to which different outlet openings are associated and which are filled in parallel via the associated outlet openings. The outlet openings are designed such that during inflation of the elements gas flow rates through the individual outlet openings to the inflatable elements are different. Since the gas flow rate from the gas supply means into the inflatable element determines the internal pressure existing in each element after a certain period, the internal pressure of the individual inflatable elements can specifically be adjusted in this way and be adapted to the respective application. There are not required any complicated components such as valves, and the size of the restraint system is not increased. In this way, inflatable elements of different sizes can be realized, which have the same internal pressure, although they are filled by the same gas generator.

Advantageously, the outlet openings and the filling volumes of the elements are adjusted to each other such that the gas supply means can generate different internal pressures in the individual inflatable elements. By specifically controlling the internal pressure in the individual inflatable elements it is possible to simultaneously fill several gas bags formed of inflatable elements, which perform different functions, by a single gas generator. Different chambers of a side gas bag can for instance be provided with a different pressure, in order to cushion the vehicle occupant on the one hand, and on the other hand to stabilize the gas bag. At the same time, other gas bags, such as an A-pillar gas bag, a sunroof gas bag or a grab handle gas bag, which should have either a higher or a lower internal pressure than the side gas bag, can be filled in parallel to a side gas bag by a common gas generator.

The control of the gas flow rates is preferably effected in that the outlet openings have different cross-sections. Since the cross-section of an opening determines the amount of gas flowing through it per time unit, i.e. the gas flow rate and thus the pressure achieved after a certain period, the cross-section of the outlet openings provides a simple and inexpensive means for controlling the pressure, which can easily be adapted to the respective application.

Advantageously, the outlet openings are disposed in the outer housing of the gas supply means such that directly upstream of all outlet openings the same pressure exists. In this way, the reproducibility of the gas flow rates through the respective outlet openings is ensured and the safety of the restraint device is increased.

The gas supply means preferably includes a gas generator accommodated in the outer housing, between the gas generator and the outer housing a pressure compensation space being formed. This pressure compensation space ensures that on the upstream side of each outlet opening the same pressure exists.

In a preferred embodiment of the invention, the inflatable elements and the gas supply means form a gas bag module which preferably is a side gas bag module disposed along the roof frame of the vehicle, the side gas bag module comprising at least one inflatable element which at least partly covers at least one side pane of a vehicle. Especially in the case of side gas bags which have large dimensions and are divided into several chambers, it may be desirable that the individual chambers have different internal pressures. A chamber covering a relatively small window in the rear of the vehicle may for instance be designed softer than a chamber which must absorb the impact of the driver or the passenger and at the same time prevent that the same is flung through the opening of a relatively large side window.

In a preferred embodiment of the invention, the gas supply means has two axial ends, the outlet openings being disposed at the axial ends and the gas generator being disposed at the roof frame behind a vehicle front seat and in front of the seat of a rear occupant, and one inflatable element each extending from the axial ends of the gas supply means to the front and to the rear. In this way, the vehicle occupant restraint system can be designed in space-saving way. There may for instance be used a tubular gas generator, so that the gas supply means can adopt a narrow, elongated shape. Due to the fact that the gas supply means is disposed in the roof frame approximately in the vicinity of the B-pillar, the flow paths for the compressed gas are kept short. The connections to the individual inflatable elements can likewise extend along this longitudinal axis, so that no additional space is required.

Advantageously, at least two inflatable elements are coupled with each other via a non-inflatable connecting member. There may, for instance, be used a known gas bag structure, in which two pieces of fabric are sewn, woven or bonded to each other such that the entire gas bag covers the side pane area from the A-pillar to the C-pillar, darts dividing the gas bag into individual chambers which are not connected with each other and are separated from each other by pieces of fabric without flow connection to the gas generator.

In accordance with a further preferred embodiment of the invention at least two separate gas bags are provided, which are formed of inflatable elements. The advantage is that material is saved, as the gas bag can be placed precisely at the respectively required point. In another embodiment it is possible that e.g. two elements are combined to form a side gas bag, whereas a third element forms an independent gas bag separate therefrom.

It is particularly advantageous when such a separate gas bag extends along the front roof frame and covers this part of the roof frame, this gas bag being in flow connection with the gas supply means for the remaining chambers. A gas bag at this place protects the head of a vehicle occupant bent forward in the case of a side impact.

In accordance with a further embodiment of the invention, the gas bag extending along the front roof frame constitutes an elongated tube, below which in the inflated condition a gas bag is disposed, which at least partly covers the front side pane. Such combination of a side gas bag and an A-pillar gas bag, which covers part of the roof frame, provides an optimum protection for a vehicle occupant on one of the front seats.

DETAILED DESCRIPTION OF THE PREFERRED EMBODIMENTS

Figure 1:
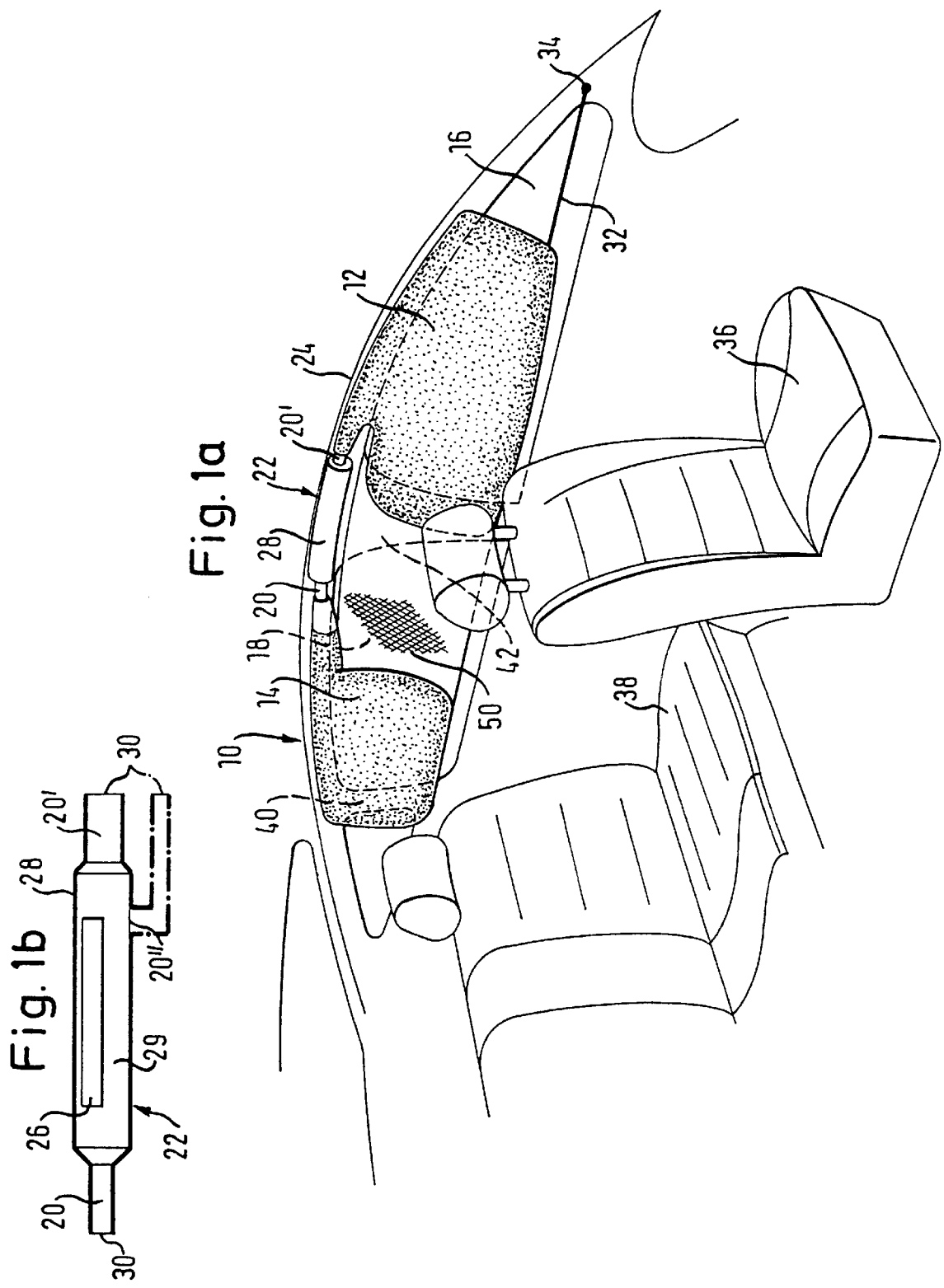
FIG. 1a shows a vehicle occupant restraint system according to the invention, in the filled condition.
FIG. 1b shows a gas supply means of a vehicle occupant restraint system according to the invention.

FIG. 1a shows a vehicle occupant restraint system 10 according to the invention in the interior of a vehicle. In this embodiment, the restraint system 10 includes two inflatable elements 12, 14, which form two independent chambers of a side gas bag, the element 12 extending across a large part of the front side pane 16 and the element 14 extending across a part of the rear side pane 18. The elements 12, 14 are disposed in those areas where in the case of a side impact the impact of the head of a vehicle occupant must be expected. Via ports 30, these inflatable elements 12, 14 are connected with a gas supply means 22 which is disposed in the vicinity of the roof frame 24 approximately in the middle between the two inflatable elements 12, 14.

The gas supply means 22 is schematically shown in FIG. 1b. It includes an outer housing 28 which has a substantially elongated shape and at its axial ends is provided with outlet openings 20, 20' of different cross-sections, to which openings the individual inflatable elements 12, 14, in this case the two chambers of the side gas bag, are connected via ports 30. In the outer housing 28 a gas generator 26 is accommodated. The elongated shape of the gas supply means 22 facilitates accommodating the same in the roof frame 24. As compressed gas source there is preferably used a tubular gas generator.

Between the gas generator 26 and the outer housing 28 a pressure compensation space 29 is formed, into which flows the compressed gas from the gas generator 26. This pressure compensation space 29 is designed such that when the compressed gas flows out of the gas generator 26, the same pressure exists in front of each outlet opening directly upstream of the outlet openings 20, 20'.

The gas supply means 22 is disposed in an area behind the front seat 36, but in front of the seat of a rear occupant 38. Due to this arrangement, both elements 12, 14 are filled with very short flow paths, and the inflatable elements 12, 14 can be produced in a very material-saving way. Long gas supply tubes can be omitted. The inflatable elements 12, 14 are supported at the roof frame 24 as well as at the C-pillar 40 and at the B-pillar 42, in order to increase their stability.

The inflatable elements 12, 14 are connected with each other via a non-inflatable piece of fabric 50 and thus form a gas bag with two chambers. At its bottom edge, this gas bag is connected with the roof frame 24 at a fastening point 34 via a fastening strap 32. The fastening strap 32 increases the stability of the gas bag.

In the non-inflated condition, prior to the activation of the vehicle occupant restraint system 10, the inflatable elements 12, 14 together with the gas supply means 22 are accommodated in the vicinity of the roof frame 24 above the B-pillar 42 of the vehicle. In the case of a side impact, a signal of a sensor not shown here activates a gas generator 26 disposed in the gas supply means 22 or another compressed gas source and releases compressed gas, which flows into the pressure compensation space 29 formed in the outer housing 28 of the gas supply means 22.

From the pressure compensation space 29, the compressed gas is distributed via the various outlet openings 20, 20' through the ports 30 to the individual inflatable elements 12, 14 and fills the latter. Depending on the volume of the element 12, 14 to be filled and depending on the intended use thereof, the cross-section of the outlet openings 20, 20' has been chosen such that each element 12, 14 is inflated to an appropriate internal pressure.

Figure 2:
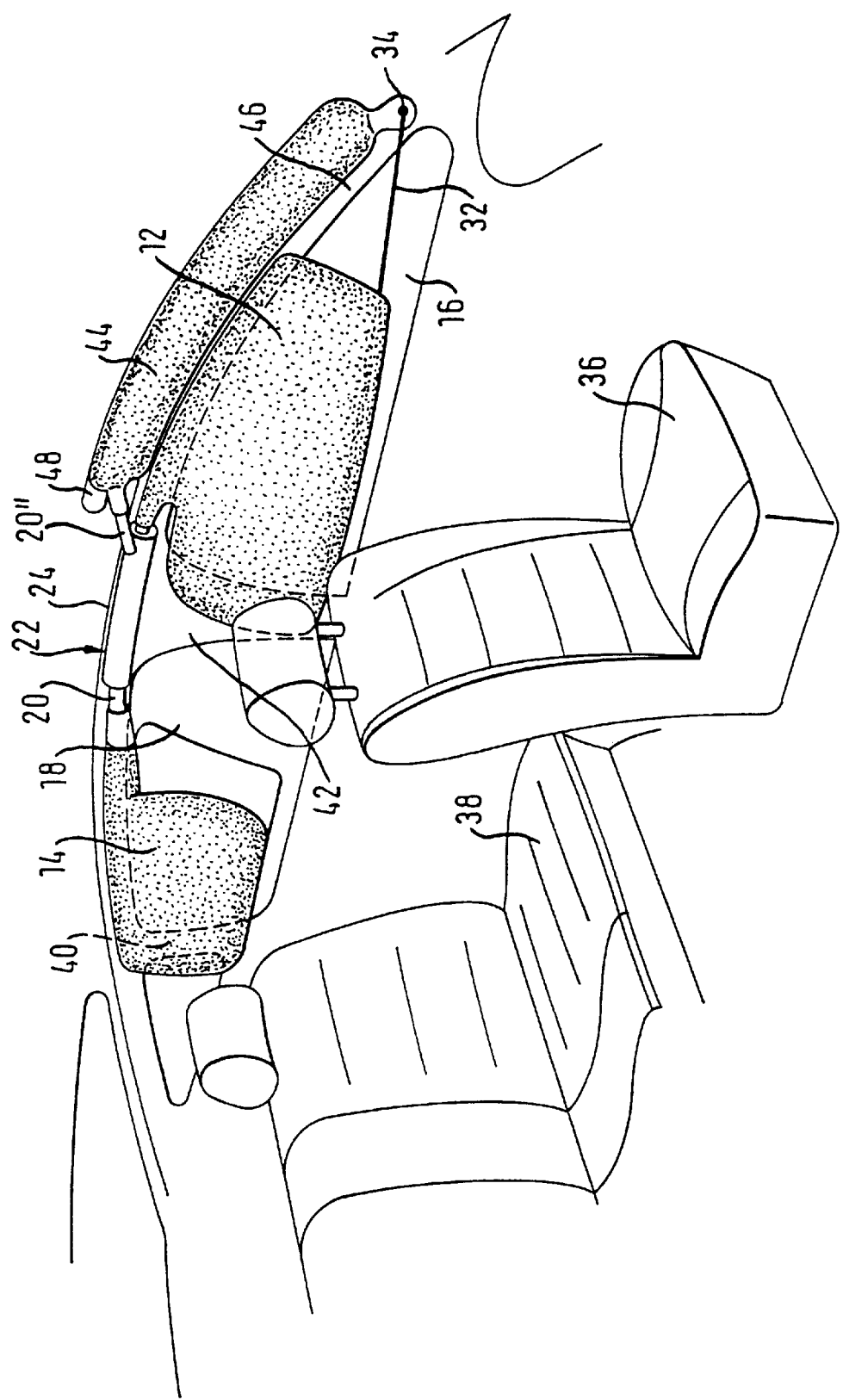
FIG. 2 shows a further embodiment of a vehicle occupant restraint system according to the invention, likewise in the filled condition.

A further embodiment of the invention, which is represented in FIG. 2, provides a further inflatable element 44 in addition to the two elements 12, 14, in this case a tubular gas bag which covers the front area of the roof frame 24, in particular of the A-pillar 46, and which is subsequently referred to as A-pillar gas bag 44. Components which were already described in conjunction with the first embodiment will not be explained again and maintain their reference numerals.

In this embodiment, the two inflatable elements 12, 14 constitute two separate gas bags, the gas bag formed of the element 12 covering a large part of the front side pane 16, and the gas bag formed of the element 14 covering a part of the rear side pane 18. There is not provided a piece of fabric which connects the inflatable chambers 12, 14 with each other.

It is of course also possible to combine a side gas bag in accordance with the first embodiment with the A-pillar gas bag 44 shown in FIG. 2.

The A-pillar gas bag 44 is connected with the pressure compensation space 29 of the gas supply means 22 via a port 30, which has an outlet opening 20" with a cross-section coordinated with the volume and the desired internal pressure of the A-pillar gas bag.

The additional connection with the outlet opening 20" is already represented in FIG. 1b in dash-dotted lines. FIG. 1b also indicates that the outlet openings 20, 20', 20" each have different cross-sections, which are adapted to the gas bag volume and the desired internal pressure.

At its end 48 facing the gas supply means 22, the A-pillar gas bag 44 is fixed at the roof frame 24, and at its other end it is fixed at the fastening point 34 of the fastening strap 32 of the element 12.

Filling the A-pillar gas bag 44 is effected as described in the first embodiment. The A-pillar gas bag 44 protects the head of the occupant on the front seat 36 against injuries. It may have a lower internal pressure than the elements 12, 14 forming the side gas bags. Since the A-pillar gas bag 44 and the side gas bag formed of the element 12, which covers the front side pane 16, are lying one above the other, a very good protection is obtained for the vehicle occupant.

The gas supply means 22 can easily be adapted to the use of one or more additional inflatable elements, such as the additional A-pillar gas bag 44 of FIG. 2. For this purpose, there are only provided additional ports with corresponding outlet openings, through which the additional inflatable elements are connected with the gas supply means. The outlet openings each have a cross-section adapted to the volume and the desired internal pressure of the additional inflatable element.

In conjunction with an increase in the number of outlet openings, a further division of the individual inflatable elements with a parallel filling would be conceivable. It would likewise be conceivable to divide the individual inflatable elements into serially connected chambers.

What is claimed is:

1. A vehicle occupant restraint system comprising:

a gas supply means including an outer housing with at least two outlet openings for providing inflation gas, and at least two inflatable elements inflatable by said inflation gas, said inflatable elements, when inflated, helping to protect a vehicle occupant, one of said outlet openings being in flow connection with one of said inflatable elements, and the other of said outlet openings being in flow connection with the other of said inflatable elements, and said outlet openings having different cross-sections for providing different gas flow rates of said inflation gas through each of said outlet openings to each of said corresponding inflatable elements upon inflation of said inflatable elements.

2. A vehicle occupant restraint system comprising:

a gas supply means including an outer housing with at least two outlet openings for providing inflation gas, and at least two inflatable elements inflatable by said inflation gas, said inflatable elements, when inflated, helping to protect a vehicle occupant, one of said outlet openings being in flow connection with one of said inflatable elements, and the other of said outlet openings being in flow connection with the other of said inflatable elements, and gas flow rates of said inflation gas being different through each of said outlet openings to each of said corresponding inflatable elements upon inflation of said inflatable elements, wherein each of said outlet openings have different cross-sections.

3. A vehicle occupant restraint system comprising:

a gas supply means including an outer housing with at least two outlet openings for providing inflation gas, and at least two inflatable elements inflatable by said inflation gas, said inflatable elements, when inflated, helping to protect a vehicle occupant, one of said outlet openings being in flow connection with one of said inflatable elements, and the other of said outlet openings being in flow connection with the other of said inflatable elements, and gas flow rates of said inflation gas being different through each of said outlet openings to each of said corresponding inflatable elements upon inflation of said inflatable elements, wherein said inflatable elements have predetermined filling volumes and said different gas flow rates generating different internal pressures in each of said inflatable elements after a predetermined time during inflation of said inflatable elements.

4. The vehicle occupant restraint system according to claim 3 wherein said gas supply means comprises a gas generator which is located in said outer housing, and wherein a pressure compensation space is formed between said gas generator and said outer housing.

5. The vehicle occupant restraint system according to claim 4 wherein the same pressure exists in said pressure compensation space directly before each of said outlet openings.

6. The vehicle occupant restraint system according to claim 4 wherein said gas supply means has two opposite axial ends and one outlet opening is disposed at one axial end and the other outlet opening is disposed at the other axial end, and wherein said gas generator is disposed at a roof frame behind a vehicle front seat and in front of a seat of a rear occupant, one inflatable element each extending from said axial ends of said gas supply means to the front and to the rear.

* * * * *